United States Patent
Zhao et al.

(10) Patent No.: US 12,182,713 B2
(45) Date of Patent: Dec. 31, 2024

(54) MULTI-TASK EQUIDISTANT EMBEDDING

(71) Applicant: Adobe Inc., San Jose, CA (US)

(72) Inventors: Handong Zhao, San Jose, CA (US); Zheng Wen, Fremont, CA (US); Sungchul Kim, San Jose, CA (US); Sheng Li, Athens, GA (US); Branislav Kveton, San Jose, CA (US)

(73) Assignee: Adobe Inc., San Jose, CA (US)

( * ) Notice: Subject to any disclaimer, the term of this patent is extended or adjusted under 35 U.S.C. 154(b) by 1067 days.

(21) Appl. No.: 16/203,263

(22) Filed: Nov. 28, 2018

(65) Prior Publication Data
US 2020/0167690 A1 May 28, 2020

(51) Int. Cl.
| | |
|---|---|
| G06N 3/084 | (2023.01) |
| G06F 9/48 | (2006.01) |
| G06F 18/10 | (2023.01) |
| G06F 18/213 | (2023.01) |
| G06N 3/08 | (2023.01) |
| G06N 7/01 | (2023.01) |
| G06N 20/00 | (2019.01) |

(52) U.S. Cl.
CPC ........... *G06N 3/084* (2013.01); *G06F 9/4881* (2013.01); *G06F 18/10* (2023.01); *G06F 18/213* (2023.01); *G06N 3/08* (2013.01); *G06N 7/01* (2023.01); *G06N 20/00* (2019.01)

(58) Field of Classification Search
CPC .......... G06N 3/08; G06N 7/005; G06N 20/00; G06K 9/6232; G06F 9/4881
See application file for complete search history.

(56) References Cited

PUBLICATIONS

Gower, John C. "The construction of neighbour-regions in two dimensions for prediction with multi-level categorical variables." Information and Classification: Concepts, Methods and Applications Proceedings of the 16th Annual Conference of "the Gesellschaft für Klassifikation eV" (Year: 1993).*
Chu et al., "Deep graph embedding for ranking optimization in e-commerce." In Proceedings of the 27th ACM International Conference on Information and Knowledge Management Oct. 17, 2018 (Year: 2018).*
Guo et al., "Entity embeddings of categorical variables." arXiv preprint arXiv:1604.06737 (2016)("Guo") (Year: 2016).*

(Continued)

*Primary Examiner* — Michael J Huntley
*Assistant Examiner* — Adam C Standke
(74) *Attorney, Agent, or Firm* — FIG. 1 Patents

(57) ABSTRACT

Systems and techniques for multi-task equidistant embedding are described that process categorical feature data to explore feature interactions. A digital analytics system enforces an equidistant relationship among features within a category while extracting high-order feature interactions by punishing both positive correlations and negative correlations among low-dimensional representations of different features. By enforcing an equidistant embedding, information is retained and accuracy is increased while higher order feature interactions are determined. Further, the digital analytics system shares knowledge among different tasks by connecting a shared network representation common to multiple tasks with exclusive network representations specific to particular tasks.

20 Claims, 11 Drawing Sheets

(56) References Cited

PUBLICATIONS

Ioffe et al., "Batch normalization: Accelerating deep network training by reducing internal covariate shift." International conference on machine learning. pmlr, 2015("Ioffe") (Year: 2015).*

Gower, John C. "The construction of neighbour-regions in two dimensions for prediction with multi-level categorical variables." Information and Classification: Concepts, Methods and Applications Proceedings of the 16th Annual Conference of the"Gesellschaft fi.ir Klassifikation eV" (Year: 1993).*

Denisiuk,"A variant of the k-means clustering algorithm for continuous-nominal data." Proceedings of the 9th International Conference on Computer Recognition Systems CORES 2015. Springer, Cham (Year: 2016).*

Guo et al., "Entity embeddings of categorical variables." arXiv preprint arXiv: 1604.06737 (Year: 2016).*

Ioffe et al., "Batch normalization: Accelerating deep network training by reducing internal covariate shift." International conference on machine learning. pmlr, (Year: 2015).*

Ma, Xiao, et al. "Entire space multi-task model: An effective approach for estimating post-click conversion rate." The 41st International ACM SIGIR Conference on Research & Development in Information Retrieval. (Year: 2018).*

Yang, Bo, et al. "Towards k-means-friendly spaces: Simultaneous deep learning and clustering." international conference on machine learning. PMLR. (Year: 2017).*

Chu et al., "Deep graph embedding for ranking optimization in e-commerce." In Proceedings of the 27th ACM International Conference on Information and Knowledge Management (Year: 2018).*

Zhang, et al. "Multi-task multi-view clustering." IEEE Transactions on Knowledge and Data Engineering 28.12 (Year: 2016).*

Agarwal,"Laser: A Scalable Response Prediction Platform for Online Advertising", In Proceedings of the 7th ACM international conference on Web search and data mining., Feb. 24, 2014, 10 pages.

Baltrunas,"Frappé: Understanding the Usage and Perception of Mobile App Recommendations In-The-Wild", May 12, 2015, 10 pages.

Bengio,"Representation Learning: A Review and New Perspectives", Oct. 18, 2012, 34 pages.

Boyd,"Distributed Optimization and Statistical Learning via the Alternating Direction Method of Multipliers", Found. Trends Mach. Learn., 3(1): 1{122, Jan. 2011, 125 pages.

Calinski,"A Dendrite Method for Cluster Analysis", Jun. 27, 1974, 28 pages.

Cheng,"Wide & Deep Learning for Recommender Systems", Jun. 24, 2016, 4 pages.

Davies,"A Cluster Separation Measure", May 1979, 5 pages.

Gilbert,"Security Analysis of SHA-256 and Sisters", In Selected Areas in Cryptography, 10th Annual International Workshop, Aug. 2003, pp. 175-193.

Guo,"DeepFM: A Factorization-Machine based Neural Network for CTR Prediction", In Proceedings of the 26th International Joint Conference on Artificial Intelligence., Mar. 13, 2017, 8 pages.

Harper,"The MovieLens Datasets: History and Context", ACM Transactions on Interactive Intelligent Systems (TiiS) 5, 4, Article 19, Dec. 2015, 20 pages.

He,"Deep Residual Learning for Image Recognition", Proceedings of the IEEE conference on computer vision and pattern recognition, 2016., Dec. 10, 2015, 12 pages.

He,"Neural Collaborative Filtering", Aug. 26, 2017, 10 pages.

He,"Neural Factorization Machines for Sparse Predictive Analytics", Aug. 16, 2017, 10 pages.

Ioffe,"Batch Normalization: Accelerating Deep Network Training by Reducing Internal Covariate Shift", Mar. 2015, 11 pages.

Juan,"Field-aware Factorization Machines in a Real-world Online Advertising System", Feb. 23, 2017, 9 pages.

Kingma,"Adam: A Method for Stochastic Optimization", Dec. 22, 2014, 9 pages.

McMahan,"Ad Click Prediction: a View from the Trenches", In Proceedings of the 19th ACM SIGKDD international conference on Knowledge discovery and data mining, Aug. 11, 2013, 9 pages.

Nair,"Rectified Linear Units Improve Restricted Boltzmann Machines", In Proceedings of the 27th International Conference on Machine Learning (ICML-10), Jun. 21, 2010, 8 pages.

Nguyen,"Gaussian Process Factorization Machines for Context-aware Recommendations", In Proceedings of the 37th international ACM SIGIR conference on Research & development in information retrieval., Oct. 5, 2014, 10 pages.

Qu,"Product-based Neural Networks for User Response Prediction", Nov. 1, 2016, 6 pages.

Rendle,"Factorization Machines with libFM", ACM Trans. Intell. Syst. Technol., 3(3), May 2012, 22 pages.

Rendle,"Factorization Machines", Dec. 2010, 6 pages.

Rendle,"Fast Context-aware Recommendations with Factorization Machines", Jul. 24, 2011, 10 pages.

Rousseeuw,"Silhouettes: a graphical aid to the interpretation and validation of cluster analysis", J. Comput. Appl. Math. 20, 1 (1987), Jun. 13, 1986, pp. 53-65.

Ruder,"An Overview of Multi-Task Learning in Deep Neural Networks", Jun. 15, 2017, 14 pages.

Shan,"Deep Crossing: Web-Scale Modeling without Manually Crafted Combinatorial Features", Aug. 2016, 8 pages.

Srivastava,"Dropout: A Simple Way to Prevent Neural Networks from Overfitting", Jun. 2014, pp. 1929-1958.

Tan,"Introduction to Data Mining", Mining, (First Edition). Addison-Wesley Longman Publishing Co., Inc., Boston, MA, USA. (2005), 2005, 169 pages.

Van der Maaten"Visualizing Data using t-SNE", Journal of Machine Learning Research, Nov. 2008, 25 pages.

Vinyals,"Show and Tell: A Neural Image Caption Generator", Apr. 20, 2015, 9 pages.

Wang,"Deep & Cross Network for Ad Click Predictions", In Proceedings of the ADKDD'17. ACM, 12., Aug. 17, 2017, 7 pages.

Xiao,"Attentional Factorization Machines: Learning the Weight of Feature Interactions via Attention Networks", Aug. 15, 2017, 7 pages.

Xie,"A Validity Measure for Fuzzy Clustering", IEEE Trans. Pattern Anal. Mach. Intell. 13, 8, Aug. 1991, pp. 841-847.

Yang,"Towards K-means-friendly Spaces: Simultaneous Deep Learning and Clustering", Jun. 13, 2017, 14 pages.

Zhang,"A Survey on Multi-Task Learning", Jul. 25, 2017, 20 pages.

Zhang,"Deep Learning based Recommender System: A Survey and New Perspectives", Aug. 3, 2017, 35 pages.

Zhu,"Semi-Supervised Learning Literature Survey", http://pages.cs.wisc.edu/~jerryzhu/pub/ssl_survey.pdf, Sep. 2005, 60 pages.

* cited by examiner

Algorithm 1: Alternating Direction SGD

Initialization:
for $t = 1 : T_{init}$ do
    Train the network with only equidistant embedding loss and classification loss, i.e., $Loss = \mathcal{L}_{embed} + \mathcal{L}_{ce}$.
end
Obtain the initial centroid G by performing k-means clustering on the last layer representation $H_l$ in the shared network.

Training:
for $t = 1 : T_{train}$ do
    Update network parameters by $\mathcal{X} \leftarrow \mathcal{X} - \eta \nabla_{\mathcal{X}} Loss_{SGD}$.
    Update cluster centroid by $g_j \leftarrow g_j - (1/o_j^t)(g_j - h_i)$,
        $i = 1, \ldots, N$,
        $j = 1, \ldots, K$.
    Update cluster assignment by
$$f_{ij} = \begin{cases} 1, & \text{if } j = \operatorname*{argmin}_{\kappa = \{1,\ldots,K\}} \|h_i - g_\kappa\|_2, \\ 0, & \text{otherwise.} \end{cases}$$
end
Output: Network parameters $\mathcal{X}$, cluster centroid G, cluster assignment F.

Fig. 7

Table 1: Results of log-Loss and AUC on different datasets.

| Datasets | Methods | Log-loss | AUC |
|---|---|---|---|
| Frappe | LR | 0.284 | 0.937 |
| | DNN | 0.145 | 0.977 |
| | NFM | 0.167 | 0.977 |
| | DNN+CE | 0.132 | 0.985 |
| | MultiTask | 0.135 | 0.983 |
| | MultiTask+CE | 0.128 | 0.987 |
| MovieLens | LR | 0.335 | 0.911 |
| | DNN | 0.334 | 0.906 |
| | NFM | 0.334 | 0.922 |
| | DNN+CE | 0.313 | 0.921 |
| | MultiTask | 0.320 | 0.917 |
| | MultiTask+CE | 0.311 | 0.932 |

Fig. 8

MULTI-TASK EQUIDISTANT EMBEDDING

BACKGROUND

Digital analytics systems are implemented to analyze "big data" (e.g., Petabytes of data) to gain insights that are not possible to obtain, solely, by human users. In one such example, digital analytics systems are configured to analyze big data to predict occurrence of future events, which may support a wide variety of functionality. Prediction of future events, for instance, may be used to determine when a machine failure is likely to occur, improve operational efficiency of devices to address occurrences of events (e.g., to address spikes in resource usage), resource allocation, and so forth.

In other examples, this may be used to predict events involving user actions. Accurate prediction of user actions may be used to manage provision of digital content and resource allocation by service provider systems and thus improve operation of devices and systems that leverage these predictions. Examples of techniques that leverage prediction of user interactions include recommendation systems, digital marketing systems (e.g., to cause conversion of a good or service), systems that rely on a user propensity to open an email or click on a link within an email, purchase or cancel a contract relating to a subscription, download an application, sign up for an email, and so forth. Thus, prediction of future events may be used by a wide variety of service provider systems for personalization, customer relation/success management, and so forth.

Conventional techniques used by digital analytics systems to predict occurrence of future events, however, are faced with numerous challenges that limit accuracy of the predictions as well as involve inefficient use of computation resources. In one example, accuracy of conventional techniques is limited by a loss of accurate relationships while extracting higher-order interactions from input information. Conventional techniques, for instance, fail to retain distance relationships between features when extracting higher-order interactions.

Further, conventional techniques rely upon expensive manually designed features for a particular task, and features carefully designed for one task are inapplicable to other tasks. Manually designed features are highly sensitive to noise or missing values. Additionally, conventional techniques produce inaccurate results when input data is highly imbalanced. For example, in a scenario where input data includes 99% of the data resulting in a first task and 1% of the data resulting in a second task, conventional techniques to predict the second task ignore 99% of the data. Therefore, these conventional techniques have limited accuracy and result in inefficient use of computational resources by systems that employ these conventional techniques.

SUMMARY

Systems and techniques for multi-task equidistant embedding are described that process categorical feature data to explore feature interactions. These techniques overcome the limitations of conventional digital analytics systems which are limited to processes involving loss of information by failing to retain distance relationships between features when extracting higher-order interactions. To do so, the equidistant embedding techniques described herein enforce an equidistant relationship among features within a category while extracting high-order feature interactions by punishing both positive correlations and negative correlations among low-dimensional representations of different features.

Further, these techniques overcome the limitations of conventional digital analytics systems which fail to fully exploit available data and do not extract or utilize complementary information across different tasks. To do so, the multi-task techniques described herein connect a shared network representation with a plurality of exclusive network representations in order to share knowledge among tasks. This may include building a neural network with layers exclusive to particular tasks forked on top of shared layers common to all tasks.

By enforcing an equidistant embedding within a multi-task system, a digital analytics system may extract and utilize feature interactions from large amounts of data with an exponential number of dimensions and may be generalized to evaluate a wide range of events beyond what is capable of being addressed by conventional feature extraction techniques. The equidistant embedding allows accurate feature information to be retained while reducing the number of dimensions calculated, thereby increasing accuracy of results as well as reducing computational complexity and resource usage. The extracted feature interaction information may be utilized in a variety of ways, such as to predict the outcome of future events such as user interactions, to segment or cluster populations, and so forth.

This summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 7 is an algorithm depicting a procedure for alternating direction SGD.

FIG. 8 is a table depicting experimental results of various techniques for predicting an outcome of a task.

DETAILED DESCRIPTION

Overview

Figure 1:
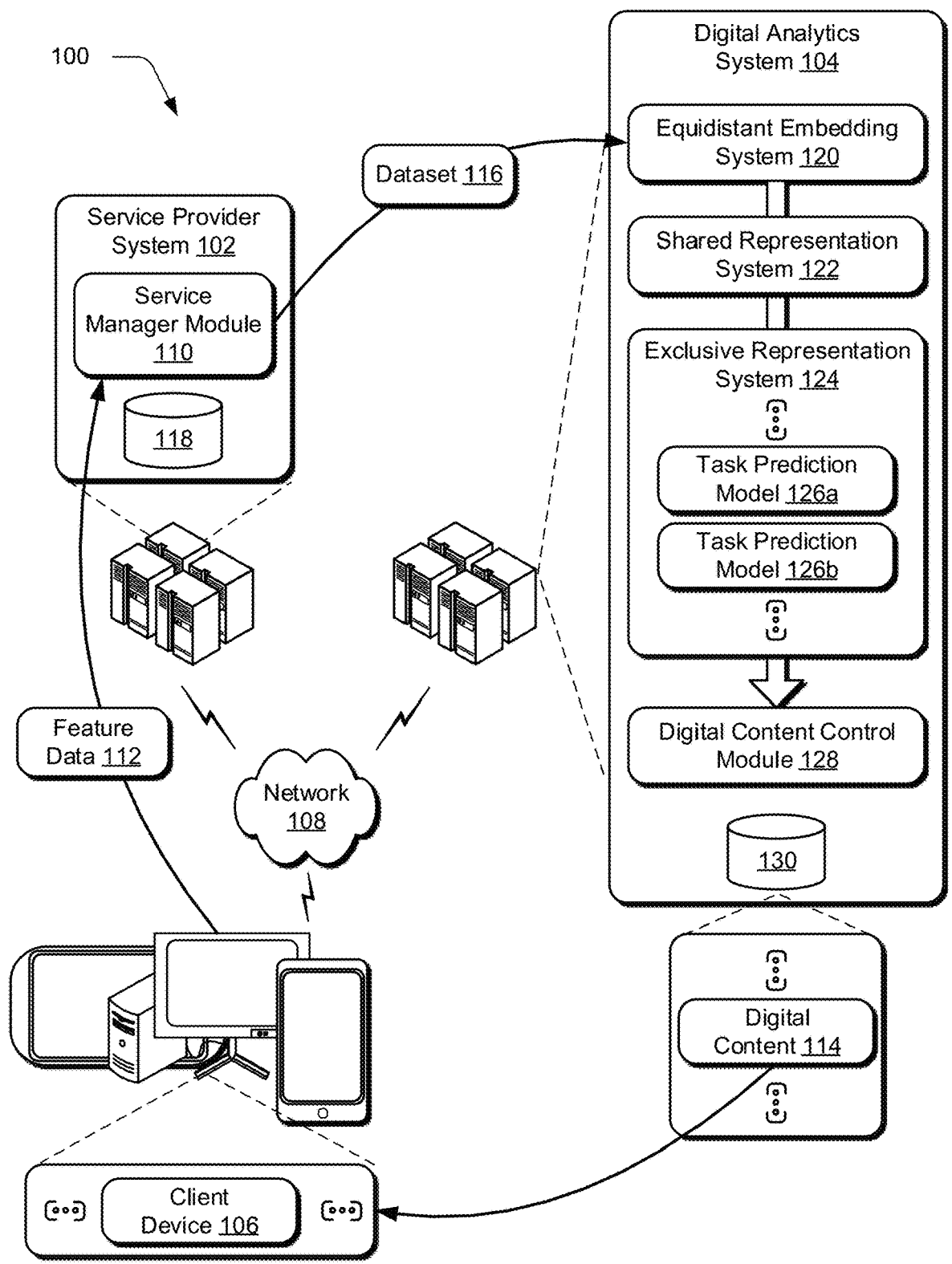
FIG. 1 is an illustration of an environment in an example implementation that is operable to employ multi-task equidistant embedding techniques as described herein.

In conventional digital analytics systems, categories and features are manually designed for particular tasks. These manually designed features, however, are expensive to design, are inapplicable to other tasks, and highly sensitive to noise or missing values. This limits performance of the conventional digital analytics systems as the extraction of higher-order feature interactions is limited to access to expensive manually designed features that are not flexible or adaptive. Further, conventional digital analytic techniques are subject to a loss of accurate relationships among features as information is translated from high-dimensionality to lower-dimensionality. This limits the accuracy of extracted higher-order interactions from the input information, and thus limits the usefulness of conventional digital analytics systems that rely upon the higher-order interactions. Additionally, conventional digital analytic techniques fail to extract and utilize complementary information across different tasks. Specifically, conventional techniques provide inaccurate results when dealing with a task for which little information exists specific to the task.

Accordingly, techniques are described in which a digital analytic system dynamically utilizes multi-task equidistant embeddings to process categorical feature data and explore feature interactions. To do so, the digital analytic system generates an equidistant embedding that preserves distance relationships between features while extracting higher-order interactions, and additionally utilizes a combination of shared and exclusive networks to exploit available data to extract complementary information across different tasks and enhance the robustness of determined feature interactions.

To begin, feature data is generated or received that describes characteristics of user interactions, such as demographics of a user or a user device. Training data is created by modifying, filtering, or translating the feature data, and so forth. For instance, the training data may be formatted as one-hot encoding vectors. The training data is input to a machine learning system to create a prediction model. In doing so, the training data is processed by an equidistant embedding system, a shared representation system, and an exclusive representation system. By analyzing features of the training data at various levels of abstraction, the prediction model can predict an outcome given a subsequent observation.

The equidistant embedding system utilizes a dense embedding strategy to maintain an equidistant relationship with high cardinality for features within a category. This is done by punishing both positive and negative correlations among low-dimensional representations of different features. For example, the equidistant embedding system may apply constraints in the form of a loss function that relies upon a comparison between a dense embedding matrix and a desirable binary feature matrix. In doing so, the equidistant embedding system projects one-hot encoding features (where features are equidistant to one another in high-dimensional space) to a low-dimensional dense representation while ensuring that the features retain equidistance in the low-dimensional space as well.

The shared representation system utilizes a number of shared network hidden layers that apply transformations to the data in order to extract high-order feature interactions between various features. The shared representation is shared among different tasks in order to extract complementary information from multiple tasks. This allows for knowledge transfer between tasks, thus ensuring robust information is utilized for each task despite any data imbalances. The shared representation implicitly discovers important feature interactions, removing the need for experts to manually craft features and interactions.

The exclusive representation system builds on top of the shared representation, such as by 'forking' the shared representation into a number of different paths. While the shared representation learns and extracts rich and complementary information and feature interactions for all tasks, the exclusive representations are designed to generate predictions for particular tasks. For example, a single neural network may be built utilizing the shared representation system and the exclusive representation, in which multiple hidden layers of a shared network are fed to multiple different exclusive networks each with their own hidden layers. The neural network, including the shared network and all exclusive networks, is trained as a single network thus promoting knowledge sharing and increasing the accuracy of generated models. For instance, a training criterion such as a loss function may include components applicable to different tasks yet be applied to all tasks.

Once a machine learning model has been trained by the machine learning system, a subsequent observation including corresponding features is input to the machine learning model in order to predict a result based on the corresponding features. For instance, the prediction may be a classification, segmentation, prediction of a user interaction, and so forth. The prediction is output, such as to control a subsequent output or creation of digital content. For example, a prediction that a user will not open an e-mail may guide a determination of whether or not to send the e-mail, may guide content creators in the creation of the e-mail, and so forth. This may also be used for device event prediction, such as to predict device failure.

In this way, the multi-task equidistant embedding techniques may be generalized to a wide range of events and large amounts of data, beyond what may be addressed by conventional feature extraction techniques. Accuracy of information is increased by eliminating or reducing a loss of information during training and by sharing complementary knowledge among different tasks. As a result, digital marketing or analytic systems utilizing the equidistant embedding techniques described herein are provided with increased accuracy and dynamic feature interactions and thus improving operational efficiency of a computing device that employs these techniques.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Term Examples

Example descriptions or explanations of certain terms as used herein are set forth below. Each term is applicable to one or more, but not necessarily all, implementations that are presented herein. Some terms are further described using one or more examples.

A "categorical feature" refers to a feature that belongs to a particular category. A "feature" refers to any attribute, aspect, characteristic, quality, property, trait, and so forth that may be used to describe an object, entity, article, interaction, and so forth. For instance, features may include demographic information, behavior information, device information, and so forth. As an example, a user interaction with digital content via a user device may be described by a feature "Chrome". In this example, the feature "Chrome" belongs to a category of "internet browsers" and is thus a categorical feature describing an internet browser utilized as a part of the user interaction with the digital content.

A "task" is an identifiable unit of work. Tasks may include, for instance, prediction of an event, clustering of data, user segmentation, determining a recommendation, analyzing an advertisement, and so forth. For example, in analysis of an email campaign a first task is prediction that a user will open an email, a second task is prediction that a user will click on a link within the email, and a third task is user segmentation of users that were sent the email.

An "equidistant embedding" refers to a mechanism of preserving distance relationships between features, such as during extraction of higher-order feature interactions. Equidistant embedding may refer to a particular scheme of preserving distance relationships during a transformation, or alternatively may refer to data that has been transformed subject to an equidistant embedding scheme. For example, an equidistant embedding may be particular constraints such as a loss function that may be applied to data during a transformation (e.g., the loss function itself is the equidistant embedding). As another example, an equidistant embedding may be a modified dataset that has been transformed in a manner that has preserved distance relationships with respect to an initial dataset (e.g., a two-dimensional dataset with preserved distance relationships is an equidistant embedding of a corresponding N-dimensional dataset).

"Feature interaction" refers to features that may individually have little correlation with a target concept or task, but combined have a strong correlation with a target concept or task. Thus, a set of features that as a combination display a correlation that is not displayed individually are interacting features.

"Complementary information" refers to knowledge gained from determining feature interaction from features associated with multiple tasks. Complementary information may refer to feature interactions that are discovered upon analysis of the multiple tasks compared to analysis of a single task, or alternatively may refer to feature interactions that are enhanced or better defined by analysis of the multiple tasks compared to analysis of the single task.

An "event" is a response or action of interest, occurrence of which, is to be predicted.

"Machine learning" refers to a computer representation that can be tuned (e.g., trained) based on inputs to approximate unknown functions. In particular, the term "machine learning model" can include a model that utilizes algorithms to learn from, and make predictions on, known data by analyzing the known data to learn to generate outputs that reflect patterns and attributes of the known data. For instance, a machine learning model can include but is not limited to, decision trees, support vector machines, linear regression, logistic regression, Bayesian networks, random forest learning, dimensionality reduction algorithms, boosting algorithms, artificial neural networks, deep learning, etc. Thus, a machine learning model makes high-level abstractions in data by generating data-driven predictions or decisions from the known input data.

Example Environment

FIG. 1 is an illustration of a digital medium environment 100 in an example implementation that is operable to employ multi-task equidistant embedding techniques in a digital analytics system as described herein. The illustrated environment 100 includes a service provider system 102, a digital analytics system 104, and a plurality of client devices, an example of which is illustrated as client device 106. In this example, events are described involving user actions performed through interaction with the client devices 106. Other types of events are also contemplated, including device events (e.g., failure, resource usage), and so forth that are achieved without user interaction. These devices are communicatively coupled, one to another, via a network 108 and may be implemented by a computing device that may assume a wide variety of configurations.

A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, although a single computing device is shown, a computing device may be representative of a plurality of different devices, such as multiple servers utilized by a business to perform operations "over the cloud" as shown for the service provider system 102 and the digital analytics system 104 and as further described in FIG. 11.

The client device 106 is illustrated as engaging in user interaction with a service manager module 110 of the service provider system 102. As part of this user interaction, feature data 112 is generated. The feature data 112 describes characteristics of the user interaction in this example, such as demographics of the client device 106 and/or a user of the client device 106, the network 108, events, locations, and so forth. The service provider system 102, for instance, may be configured to support user interaction with digital content 114. A dataset 116 is then generated (e.g., by the service manager module 110) that describes this user interaction, characteristics of the user interaction, the feature data 112, and so forth, which may be stored in a storage device 118.

The digital content 114 may take a variety of forms and thus user interaction and associated events with the digital content 114 may also take a variety of forms in this example. A user of the client device 106, for instance, may interact with or consume the digital content 114 such as by reading an article, viewing a digital video, listening to digital music, viewing posts and messages on a social network system, subscribing or unsubscribing, purchasing an application, and so forth. In another example, the digital content 114 is configured as digital marketing content to cause conversion of a good or service, e.g., by "clicking" an ad, purchase of the good or service, and so forth. Digital marketing content may also take a variety of forms, such as electronic messages, email, banner ads, posts, articles, blogs, and so forth. Accordingly, digital marketing content is typically employed to raise awareness and conversion of the good or service corresponding to the content. In another example, user interaction and thus generation of the dataset 116 may also occur locally on the client device 106.

The dataset 116 is received by the digital analytics system 104, which in the illustrated example employs this data to control output of the digital content 114 to the client device 106. To do so, the digital analytics system 104 utilizes an equidistant embedding system 120, a shared representation system 122, and an exclusive representation system 124 to generate task prediction models such as a first task prediction model 126a and a second task prediction model 126b. The task prediction models 126 are utilized to guide creation or output of the digital content 114, e.g., by controlling which items of the digital content 114 are output to the client device 106. The task prediction models 126, for instance, may be used to predict occurrence of an event (e.g., whether or not the event will occur for the client device 106) based on an observation obtained from the client device 106.

As an example, the task prediction models 126 may be configured to predict a response of a user of the client device 106 to an email campaign. In this example, the first task prediction model 126a may specify whether the client device 106 is likely to open an email, while the second task prediction model 126b may specify whether the client device 106 is likely to click on a link contained within the email. The task prediction models 126 may then be used by a digital content control module 128 to control output of the digital content 114 to the client device 106. This may include the digital content control module 128 selecting a particular email to send from among a set of possible emails, determining whether or not to send any email, and so forth. Although the digital content 114 is illustrated as maintained in a storage device 130 by the digital analytics system 104, this digital content 114 may also be maintained and managed by the service provider system 102, the client device 106, and so forth.

Conventional feature extraction techniques fail when confronted with "big data" having a multitude of observations. For instance, although one-hot encoding representations of information preserve information with high-cardinality and high-dimensionality, one-hot encoding vectors are not scalable for large datasets and are impracticable as representations to feed into a neural network due to the computational complexity of the number of dimensions involved with one-hot encoding vectors. Further, conventional machine learning techniques to explore feature interactions require strong expert knowledge to manually design combinatorial features, which are expensive to create, maintain, and deploy. Additionally, such handcrafted features designed for a particular task cannot be generalized to other tasks, and are infeasible for datasets with imbalanced data among tasks.

Accordingly, in the techniques described herein a multi-task equidistant embedding technique is implemented by the digital analytics system 104 such that feature extraction may address "big data," which is not possible in conventional techniques. Further, these techniques may be generalized to a wide range of events that are not capable of being addressed by conventional feature extraction techniques. To do so, equidistant embedding techniques of the equidistant embedding system 120 are used to enforce an equidistant relationship among features within a category while extracting high-order feature interactions, and multi-task techniques of the shared representation system 122 and the exclusive representation system 124 are used to transfer knowledge between different tasks to provide complementary information capable of increasing the accuracy of determined high-order feature interactions. In this way, equidistant embedding and multi-task techniques may be used alone or in combination to overcome limitations of conventional techniques, and thus improve a user experience as well as operational efficiency of computing devices that employ these techniques.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 2:
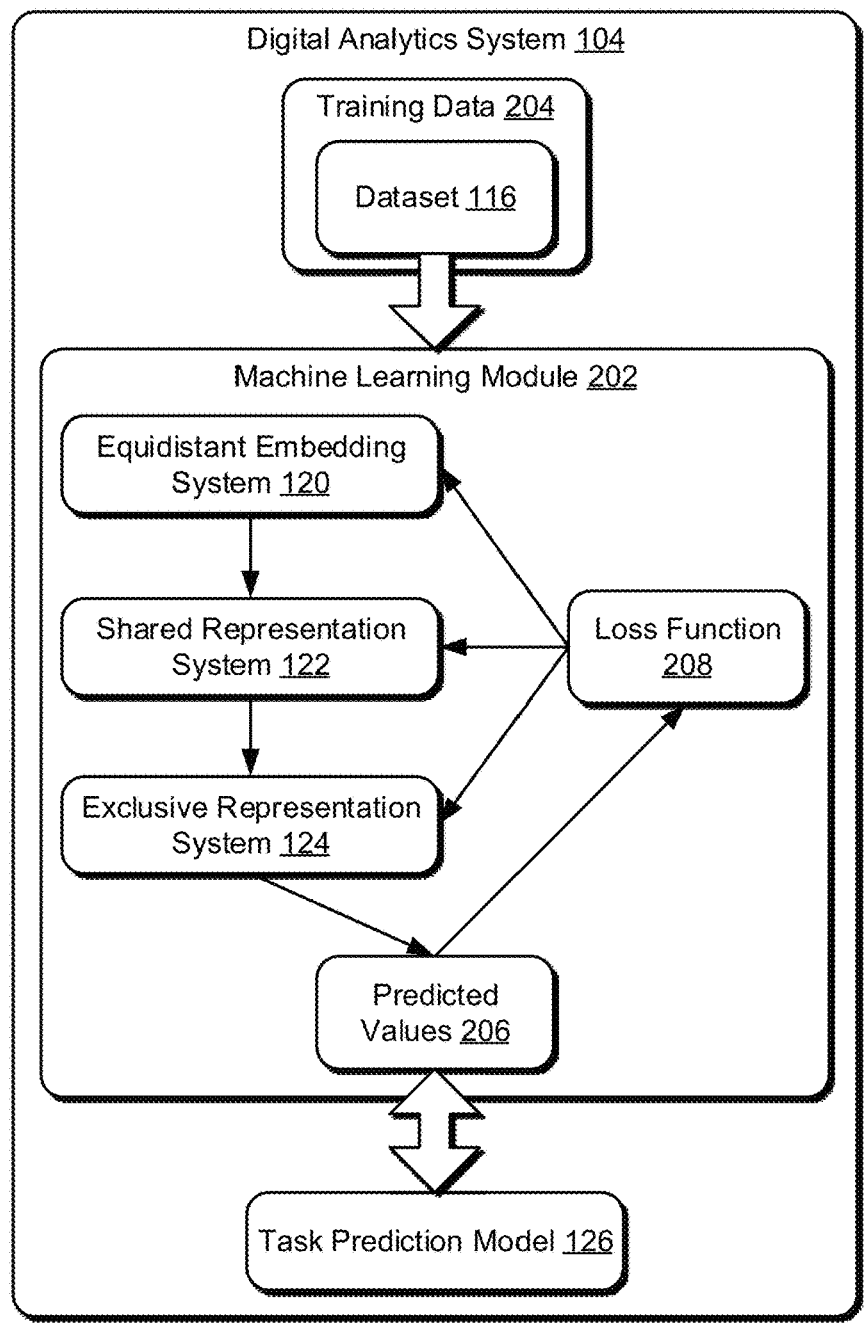
FIG. 2 depicts an example system showing a digital analytics processing pipeline of the digital analytics system of FIG. 1 in greater detail.

FIG. 2 depicts a system 200 showing an example digital analytics processing pipeline of the digital analytics system 104 of FIG. 1 in greater detail to create the task prediction model 126. In some implementations, the digital analytics system 104 employs a machine learning module 202 to create the task prediction model 126. The digital analytics processing pipeline begins with creation of training data 204, which is input to the machine learning module 202.

The training data 204 is created by retrieving the dataset 116, such as via the network 108. The dataset 116 may be modified such as to incorporate a particular initial encoding scheme, apply batch normalization or dropout, and so forth. For instance, the dataset 116 may be received as or converted to one-hot encoding vectors such that each component of the vector represents a different feature. The one-hot encoding vectors are then fed to a dense embedding layer as an initial step to create vectors with only non-zero features. As an example, for a one-hot encoding vector $x \in \mathbb{R}^m$ where m denotes the size of the dictionary, $x_i=0$ means the i-th category does not exist in the instance, and $\Sigma_{i=1}^{m} x_i = n$, the vectors x can be converted to categorical vectors with non-zero features such as $V_x = \{x_i v_i\}$ where $x_i \neq 0$ and i denotes a category of the feature.

Batch normalization may be applied to the dataset 116 when creating the training data 204, in order to minimize the internal covariate shift. Batch normalization may normalize layer inputs to a zero-mean unit-variance for each mini-batch within a process, which improves performance and speeds convergence for the process. For example, given a mini-batch of input data $\beta = \{b_{1 \ldots m}\}$, batch normalization may normalize $b_i$ as $$BN(b_i) = \gamma \odot \left( \frac{b_i - \mu_\beta}{\sigma_\beta} \right) + B,$$

where $$\mu_\beta = \frac{1}{\beta} \sum_{i \in \beta} b_i$$

denotes the mean over mini-batch $\beta$ and $$\sigma_\beta^2 = \frac{1}{|\beta|} \sum_{i \in \beta} (b_i - \mu_\beta)^2.$$

Learnable parameters γ and β scale and shift the normalized value to restore the representation power of the network. In some implementations, the distribution of each mini-batch input is normalized for each layer within the machine learning module 202 starting from an embedding layer.

Further, dropout may be applied to the dataset 116 when creating the training data 204. Dropout is a regularization technique for reducing overfitting by preventing complex co-adaptations on training data. Units are randomly dropped from the network during training, resulting in a number of different 'thinned' networks. At test time, no dropout is performed. The network approximates the effect of averaging the predictions of all the thinned networks by using a single un-thinned (no dropout) network that has smaller weights. In some implementations, units are dropped from the network during training with a probability of 0.5.

The training data 204 is input to the machine learning module 202 to create the task prediction model 126. In order to do so, the machine learning module 202 employs the equidistant embedding system 120, the shared representation system 122, and the exclusive representation system 124 of the digital analytics system 104 as different layers of a deep neural network, as described in greater detail below with respect to FIG. 4. By analyzing features of the training data (e.g., at various levels of abstraction or depths within levels of a neural network) the task prediction model 126 can predict an outcome given a subsequent observation, can segment populations, and so forth. The task prediction model 126 when provided with the training data 204 as an input thus creates predicted values 206 for units within the training data 204. To verify the accuracy of the predicted values 206, the machine learning module 202 compares the predicted values 206 with the correct values in the training data 204. The predicted values 206 may be generated, for instance, through a prediction layer by projecting a last hidden representation of the network, $h_l$, to $a \in \mathbb{R}^c$ according to $a=U^T h_l$, where c is the number of classes and U is the projection matrix. As an example, for a binary classification problem (e.g., click-through rate prediction in marketing analytics) c equals 2. As a is acquired, a training criterion may be applied to further refine the predicted values 206.

For instance, the machine learning module 202 can determine the differences between the predicted values 206 and the actual values by utilizing a loss function 208 to determine a measure of loss (i.e., a measure of difference such as a mean square error or mean absolute loss). For example, the loss function 208 can determine a measure of loss for each outcome between the predicted outcome and the actual outcome, can determine a measure of loss for each segmentation assignment between the predicted segment and the actual segment, and so forth. The machine learning module 202 uses the loss function 208 (e.g., uses the measure of loss resulting from the loss function 208) to train the task prediction model 126. In particular, the machine learning module 202 can utilize the loss function 208 to correct parameters or weights that resulted in incorrect predicted values. The machine learning module 202 can use the loss function 208 to modify one or more functions or parameters, such as to modify one or more functions or parameters in its prediction algorithms to minimize the loss function 208 and reduce the differences between the predicted values 206 and the correct values in the training data 204. In this way, the machine learning module 202 may employ the loss function 208 to learn the task prediction model 126 through processing of the training data 204. In some implementations, a plurality of different loss functions may be employed within the machine learning module 202, for instance a different loss function for each of the equidistant embedding system 120, the shared representation system 122, and the exclusive representation system 124. Once trained, the task prediction model 126 may then be used such as to perform classifications, segmentations, predictions, and so forth.

As described above, the machine learning module 202 can train the task prediction model 126 using the training data 204 derived from the dataset 116. The machine learning module 202 can use any suitable machine learning techniques. According to various implementations, the machine learning module 202 uses supervised learning, unsupervised learning, or reinforcement learning. For example, the machine learning module 202 can include, but is not limited to, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. In any case, the machine learning module 202 uses machine learning techniques to continually train and update the task prediction model 126 to produce accurate predictions given a subsequent observation.

Figure 3:
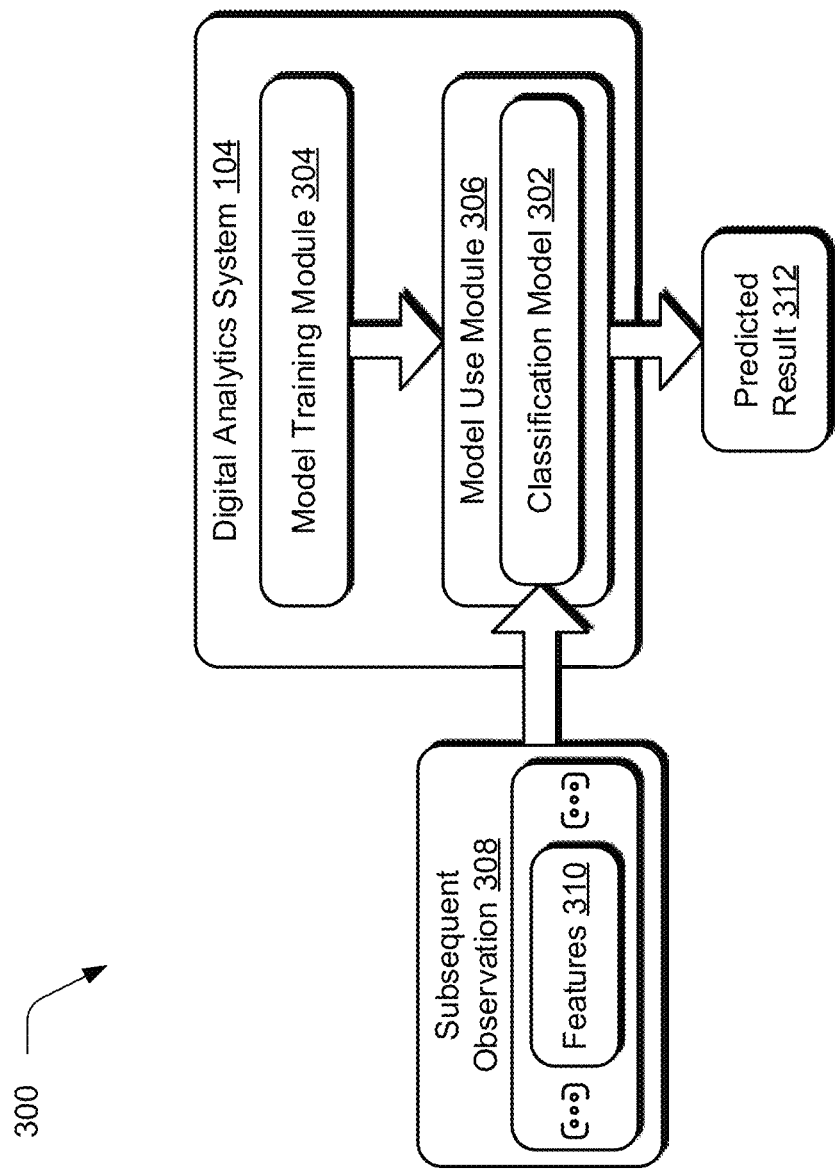
FIG. 3 depicts an example system showing usage of the task prediction model of FIG. 1 in greater detail.

For example, a task prediction model 126 may be trained as a classification model 302 using the training data 204 and included observations to make a prediction about occurrence of a subsequent event. As shown in the example system 300 of FIG. 3, for instance, the classification model 302, once trained, is passed from a model training module 304 (e.g., the machine learning module 202 of FIG. 2) to a model use module 306 (e.g., the digital content control module 128 of FIG. 1). The module use module 306 receives a subsequent observation 308 including corresponding features 310. Using the trained classification model 302, a predicted result 312 is generated based on the features 310 corresponding to the subsequent observation 308. The predicted result 312 is then output, e.g., to control subsequent output of digital content 114, for display in a user interface, and so forth. In this way, the techniques described herein may address a wide range of categorical feature data as part of analysis and classification for a wide range of device and user action prediction scenarios, which is not possible using conventional techniques.

Figure 4:
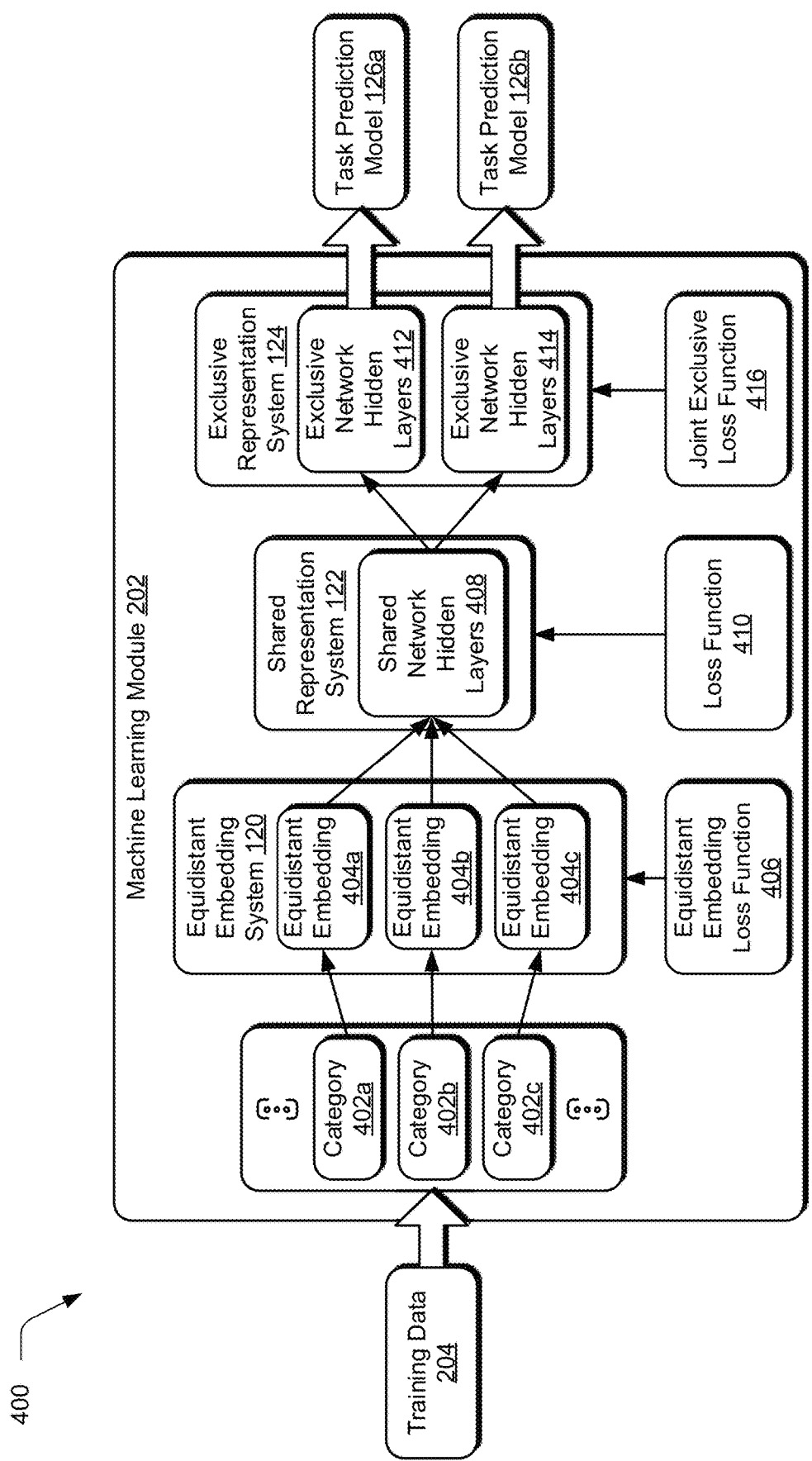
FIG. 4 depicts an example system showing a machine learning processing pipeline of the machine learning module of FIG. 2 in greater detail.

FIG. 4 depicts a system 400 showing an example machine learning processing pipeline of the machine learning module 202 of FIG. 2 in greater detail to create the task prediction models 126a and 126b. The machine learning processing pipeline begins with the training data 204 being input to the machine learning module 202. The training data 204 is utilized to identify or extract a number of categorical features, such as features within categories 402a, 402b, and 402c. A categorical feature refers to a feature within a category. Examples of categories 402 include a country of origin for a user or device, a gender of a user, a user ID for a user, a web domain visited by a user, a browser type or operating system of a device, and so forth. For a particular category, a number of features exist. As an example, for the category of "internet browser", features may exist for "Chrome", "Firefox", and "Internet Explorer." One-hot encoding maintains an equidistant relationship among features within a category, such as d(One-hot$_{Chrome}$, One-hot$_{Firefox}$)=d(One-hot$_{Chrome}$, One-hot$_{IE}$)=d(One-hot$_{IE}$, One-hot$_{Firefox}$), where d(x,y) denotes the distance between two vectors x and y. The distance can be measured as Euclidean distance, correlation-based distance (e.g., Pearson's correlation, cosine similarity), and so forth. However, conventional techniques to convert a one-hot encoding feature to a low-dimensional dense representation fail to maintain this equidistance, and information is lost when utilizing conventional techniques.

Figure 5:
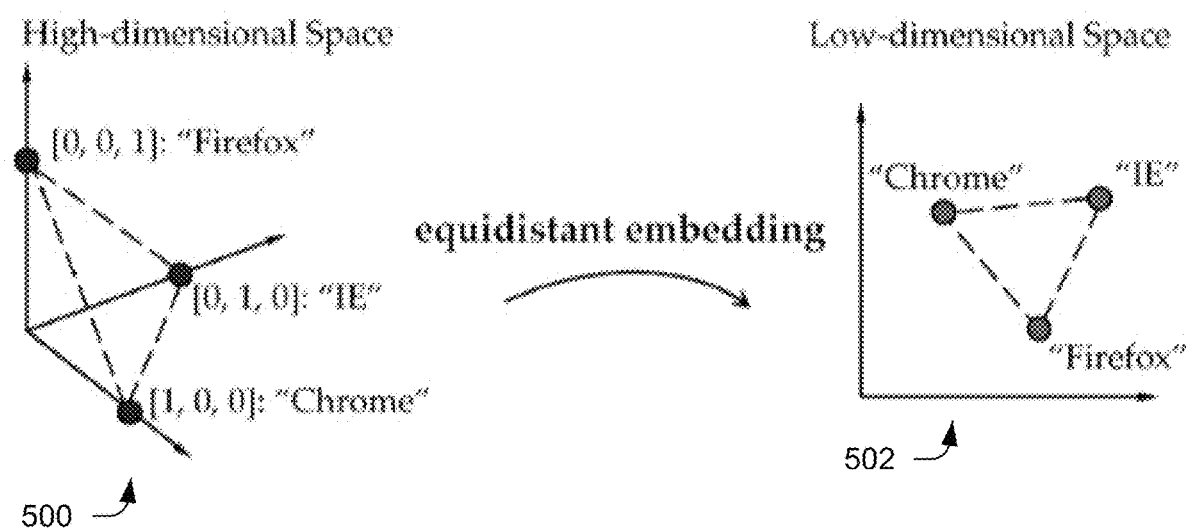
FIG. 5 depicts example graphs of a category subjected to an equidistant embedding.

The equidistant embedding system 120 utilizes a dense embedding strategy to maintain an equidistant relationship with high cardinality for features within each different category 402 as described further with respect to FIG. 5. Graph 500 illustrates a high-dimensional representation of a category including the features "Chrome" corresponding to a one-hot encoding vector of [1, 0, 0], "IE" corresponding to a one-hot encoding vector of [0, 1, 0], and "Firefox" corresponding to a one-hot encoding vector of [0, 0, 1]. As the category includes three features, the one-hot encoding vectors are represented in three-dimensional space where each feature is equidistant to each other feature, e.g. d(One-hot$_{Chrome}$, One-hot$_{Firefox}$)=d(One-hot$_{Chrome}$, One-hot$_{IE}$)=d (One-hot$_{IE}$, One-hot$_{Firefox}$). Due to the computational complexity of ever-increasing dimensionality as the size of categories increase, the features are converted to a low-dimensional space, for example two-dimensional space. While conventional techniques lose the equidistant relationships among features, the equidistant embedding system 120 maintains the equidistant relationships with high cardinality. For instance, graph 502 illustrates a low-dimensional representation of the above-described example category. In the graph 502, the features "Chrome", "IE", and "Firefox" have each been assigned two-dimensional coordinates with equidistant relationships such that d(One-hot$_{Chrome}$, One-hot$_{Firefox}$)=d(One-hot$_{Chrome}$, One-hot$_{IE}$)=d(One-hot$_{IE}$, One-hot$_{Firefox}$) in two-dimensional space. However, the magnitude of the distance in two-dimensional space may differ from the magnitude of the distance in three-dimensional space.

Returning to FIG. 4, an equidistant embedding 404a is created corresponding to the category 402a, an equidistant embedding 404b is created corresponding to the category 402b, an equidistant embedding 404c is created corresponding to the category 402c, and so forth. To do so, both positive correlations and negative correlations among low-dimensional representations of different features are punished. Once a low-dimensional dense embedding has been created by the equidistant embedding system 120 for each category 402, the low-dimensional dense embeddings are fused together into a single collective equidistant embedding of the training data 204. This can be performed in any number of ways, such as through concatenation, element-wise multiplication, bi-interaction layers, and so forth. The fused embeddings are then input to the shared representation system 122.

For example, given a batch of data instances $x \in \mathbb{R}^{N \times m}=[x^{(1)}, \ldots, x^{(N)}]^T$, where N is the batch size, a dense embedding matrix is created as $V \in \mathbb{R}^{N \times nk}$, where $V=[V^{(1)}, \ldots, V^{(N)}]$ and $V^{(i)} \in \mathbb{R}^{N \times k}$. For each feature category I, I=[1, ..., n], a correlation coefficient matrix $R^{(i)}$ is constructed such that $R^{(i)} \in \mathbb{R}^{N \times N}$ by $$R_{pq}^{(i)} = \frac{V_p^{(i)} \cdot V_q^{(i)}}{\|V_p^{(i)}\|_2 \cdot \|V_q^{(i)}\|_2},$$

where $V_p^{(i)} \cdot V_q^{(i)}$ denotes the inner product of the p-th and q-th instance's dense embedding vectors in $V^{(i)}$ and $\| \|_2$ is the vector $\ell_2$-norm. $R^{(i)}$ is enforced to approximate a desirable binary matrix $S^{(i)} \in \mathbb{R}^{N \times N}$, where the element $S_{pq}^{(i)}=1$ if instances p and q indicate the same feature within the i-th category, else $S_{pq}^{(i)}=0$. Thus, an equidistant embedding loss function 406 for all categorical features can be represented as $\mathcal{L}_{embed}(V)=\Sigma_{i=1}^{n}\|R^{(i)}-S^{(i)}\|_F^2$, where $\| \|_F$ denotes the matrix Frobenius norm. The equidistant embedding loss function 406 is applied to layers of the neural network corresponding to the equidistant embedding system 120.

In this example, for each category there exists one desirable feature matrix S. This preserves the equidistant relationship separately for each respective category, allowing for interactions between different categorical features to be captured by later stacked deep layers such as those included as part of the shared representation system 122 or the exclusive representation system 124. In some implementations each feature matrix S is symmetric and binary. However, in other implementations, additional information may be utilized to design an asymmetric, continuous value matrix with a certain property. For example, a particular categorical feature may be designed to include a hierarchical relationship.

The shared representation system 122 may include a number of shared network hidden layers 408. The shared network hidden layers 408 represent a number of fully connected layers that apply transformations to the data in order to extract high-order feature interactions between the various categorical features. Additionally, the shared network hidden layers 408 extract complementary information beneficial to multiple tasks. For example, in a scenario where the machine learning module 202 is learning two supervised tasks (e.g., an open prediction task and a click prediction task for an email campaign), the shared network hidden layers 408 extract information from all of the training data 204 irrespective of task designations (e.g., from both training data corresponding to the open task and from training data corresponding to the click task). This allows the shared representation system 122 to extract rich information that benefits both tasks, and particularly benefits imbalanced tasks for which the training data 204 contains scarce amounts of data. In other words, the techniques described herein allow the example click task for which little data exists within the training data 204 to benefit from complementary knowledge based on data corresponding to the open task for which much more data exists within the training data 204.

The shared network hidden layers 408 may be subject to a training criterion such as a loss function 410. In implementations, the loss function 410 is different than the equidistant embedding loss function 406, or alternatively the loss function 410 may incorporate and thus supersede the equidistant embedding loss function 406. In some implementations, the loss function 410 includes a classic cross-entropy loss with Softmax. For instance, the prediction probability p of an instance after Softmax function may be represented as $$p_j = \frac{e^{a_j}}{\sum_{k=1}^{c} e^{a_k}}$$

for j=1, c. Given the prediction probability p and ground-truth label $t \in \{0,1\}$, the binary cross-entropy loss $\mathcal{L}_{ce}(p,t)$ may be represented as $\mathcal{L}_{ce}(p, t) = -t \log(p) - (1-t) \log(1-p)$.

Figure 6:
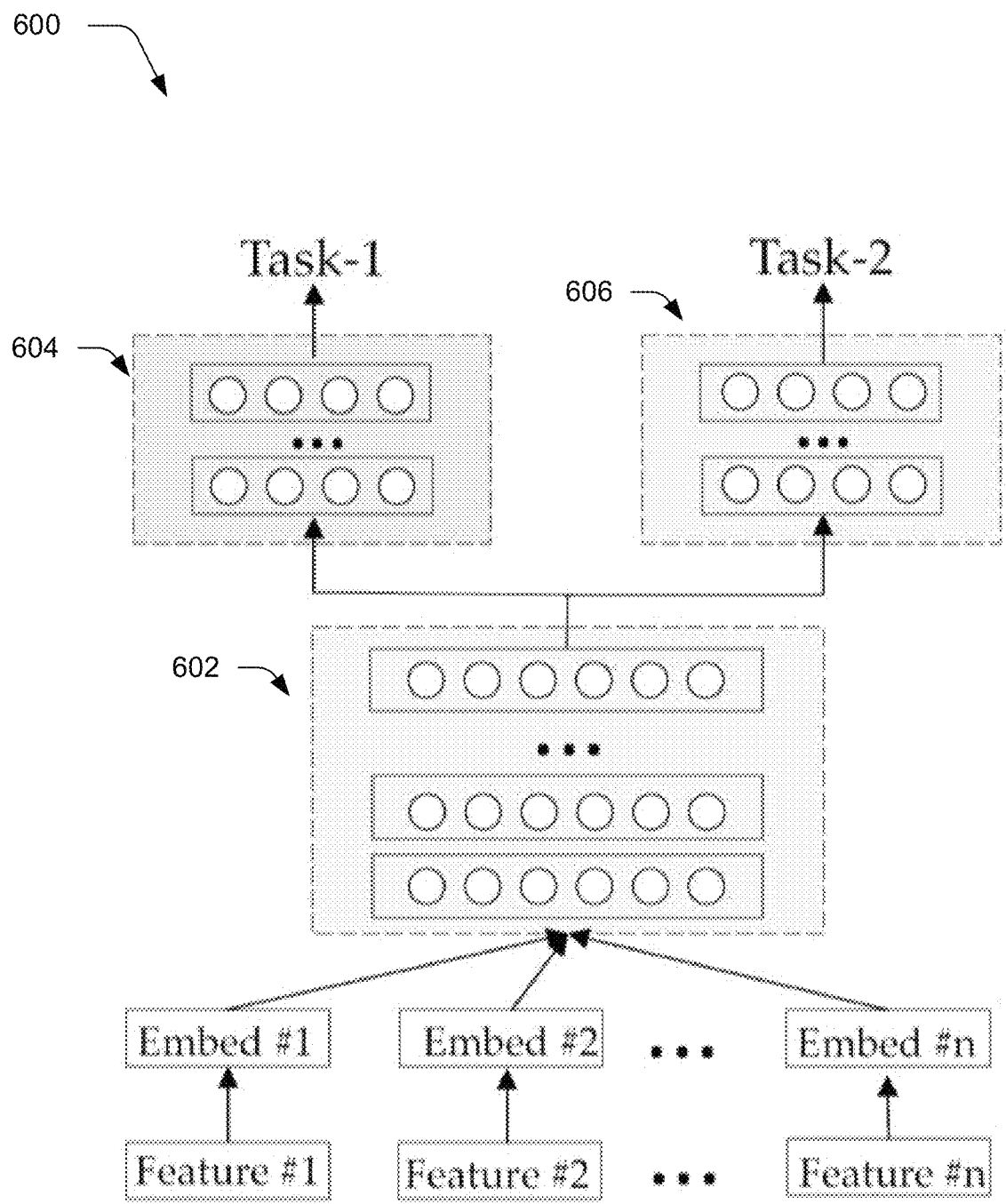
FIG. 6 depicts an example system showing a neural network that is operable to employ multi-task equidistant embedding techniques as described herein.

The exclusive representation system 124 includes exclusive networks for different tasks that are built on top of the shared network hidden layers 408. The exclusive networks represent forks in the network as a whole, as further illustrated with respect to FIG. 6. Although two exclusive networks are illustrated in FIG. 4 and in FIG. 6, it is to be appreciated that any number of exclusive networks may be utilized. Exclusive network hidden layers 412 represent layers of the neural network exclusively corresponding to the first task prediction model 126a, and exclusive network hidden layers 414 represent layers of the neural network that exclusively correspond to the second task prediction model 126b. As shown in FIG. 6, a neural network 600 includes a plurality of hidden layers in a shared network 602, a plurality of hidden layers in an exclusive network 604 corresponding to Task-1, and a plurality of hidden layers in an exclusive network 606 corresponding to Task-2. The shared network 602, the exclusive network 604, and the exclusive network 606 are each included within the single neural network 600.

Returning to FIG. 4, the exclusive network hidden layers 412 and 414 may be subject to training criterions such as a joint exclusive loss function 416. In implementations, the joint exclusive loss function 416 is different than the equidistant embedding loss function 406 or the loss function 410, or alternatively the joint exclusive loss function 416 may incorporate and thus supersede the equidistant embedding loss function 406 and the loss function 410. Further, the joint exclusive loss function 416 varies depending on the nature of the tasks modeled by the task prediction model 126a and the task prediction model 126b. Examples given below include a first scenario including two supervised tasks and a second scenario including one supervised task and one unsupervised task.

In an example of the first scenario including two supervised tasks, the task prediction model 126a is designed to predict an open task for an email campaign and the task prediction model 126b is designed to predict a click task in the email campaign. As illustrated, the open task and the click task are each given an exclusive network for prediction via the exclusive network hidden layers 412 and 414, respectively. A jointly trained loss function, such as the joint exclusive loss function 416, is formulated as $Loss_{MT-1} = \mathcal{L}_{embed}(V) + \Sigma_{i=1}^2 \mathcal{L}_{ce}(p^{(i)}, t^{(i)})$, where the i-th task is $p^{(i)}$ and its corresponding prediction label is $t^{(i)}$. In some implementations, $\mathcal{L}_{embed}(V)$ is the equidistant embedding loss function 406 and $\mathcal{L}_{ce}(p,t)$ is the binary cross-entropy loss as described with respect to the loss function 410.

In an example of the second scenario including one supervised task and one unsupervised task, the task prediction model 126a is designed to predict an open task for an email campaign and the task prediction model 126b is designed to perform user segmentation on a population of users. As illustrated, the open task and the user segmentation task are each given an exclusive network via the exclusive network hidden layers 412 and 414, respectively. In this example, the user segmentation task is solved through use of clustering. Given a last layer representation $H \in \mathbb{R}^{N \times r}$, where r is the size of the last layer of the unsupervised network, an unsupervised loss function $\mathcal{L}_{seg}(H)$ may be represented as $\mathcal{L}_{seg}(H) = _{F,G}{}^{min} \|H - FG\|_F^2$, subject to $F_{ij} \in \{0,1\}$, $\Sigma_{j=1}^K F_{ij} = 1$, and $\forall i = 1, 2, \ldots N$, where K is the number of clusters, $F \in \mathbb{R}^{N \times K}$ is a cluster assignment matrix that satisfies a 1-of-K encoding scheme, and $G \in \mathbb{R}^{K \times r}$ is a cluster centroid matrix. Thus, in implementations, the joint exclusive loss function 416 may be represented as $Loss_{MT-2} = \mathcal{L}_{embed}(V) + \mathcal{L}_{ce}(p,t) + \mathcal{L}_{seg}(H)$. In some implementations, $\mathcal{L}_{embed}(V)$ is the equidistant embedding loss function 406 and $\mathcal{L}_{ce}(p,t)$ is the binary cross-entropy loss as described with respect to the loss function 410.

When assigning an instance to its corresponding cluster (e.g., updating F), the cluster with the closest centroid is chosen. Using conventional techniques, Euclidean distances between the target instance and the cluster centroids are used. However, Euclidean distances tend to have a trivial solution when the number of hidden layers in the network is large. This presents a number of challenges, including that segmentation loss is non-continuous due to the 1-of-K requirement and a corresponding optimization step cannot be directly integrated to a back-propagation algorithm, and batch-based k-means clustering requires a careful learning rate for updating G. To overcome these challenges associated with conventional techniques, the digital analytics system 104 utilizes an alternating direction SGD strategy.

A collection of the network parameters is denoted as X=(W, b, V, U). A corresponding gradient is calculated using back-propagation algorithms, which is represented as $\nabla XLoss_{MT-2}$. The network parameters are updated according to $X \leftarrow X - n\nabla XLoss_{MT-2}$, where the scaler n is the learning rate. When updating the cluster centroid G, the network parameters (including H) and the cluster assignment matrix F are fixed. G is updated as $g_j \leftarrow g_j - (1/o_j^i)(g_j - h_i)$ for $i=1, \ldots, N$, and $j=1, \ldots, K$, where $h_i$ denotes the i-th instance of the last layer representation H in a batch. $o_j^i$ counts the number of times the algorithm has assigned a sample to cluster j before handling the incoming sample i. $1/o_j^i$ controls the learning rate to update the cluster centroid matrix G. F is updated by fixing the network parameters and G, and $F_g$ is updated according to $$F_{ij} = \begin{cases} 1, & \text{if } j = \underset{\kappa=\{1,\ldots,K\}}{\operatorname{argmin}} \|h_i - g_\kappa\|_2, \\ 0, & \text{otherwise.} \end{cases}$$

This process is illustrated as Algorithm 1 in FIG. 7.

The multi-task equidistant embedding techniques described herein are a technological improvement over conventional prediction models. The open-public benchmark datasets Frappe and MovieLens were evaluated using a number of conventional prediction models and compared to the multi-task equidistant embedding techniques employed by the digital analytics system 104 using both log-loss and AUC (area under the ROC curve) metrics. The multi-task equidistant embedding techniques (MultiTask+CE) outperform, under both metrics, each of the following techniques: logistic regression (LR) with l-2 regularization applied to one-hot encoding features, a standard deep neural network (DNN) with batch normalization layers affiliated to the dense embedding layer and the fully connected hidden layers, and a Neural Factorization Machine (NFM) for sparse predictive analysis. Additionally, the multi-task equidistant embedding techniques (MultiTask+CE) outperform a DNN modified to incorporate the equidistant embedding system 120 (DNN+CE), and a multi-task embedding system of the shared representation system 122 and the exclusive representation system 124 designed without incorporating the equidistant embedding system 120 (MultiTask). The experimental results are shown in Table 1 of FIG. 8, wherein the log-loss metric denotes improved accuracy as the value decreases and the AUC denotes improved accuracy as the value increases. As seen in Table 1 of FIG. 8, the equidistant embedding techniques and the multi-task techniques described herein are each a technological improvement over conventional supervised task models.

Figure 9:
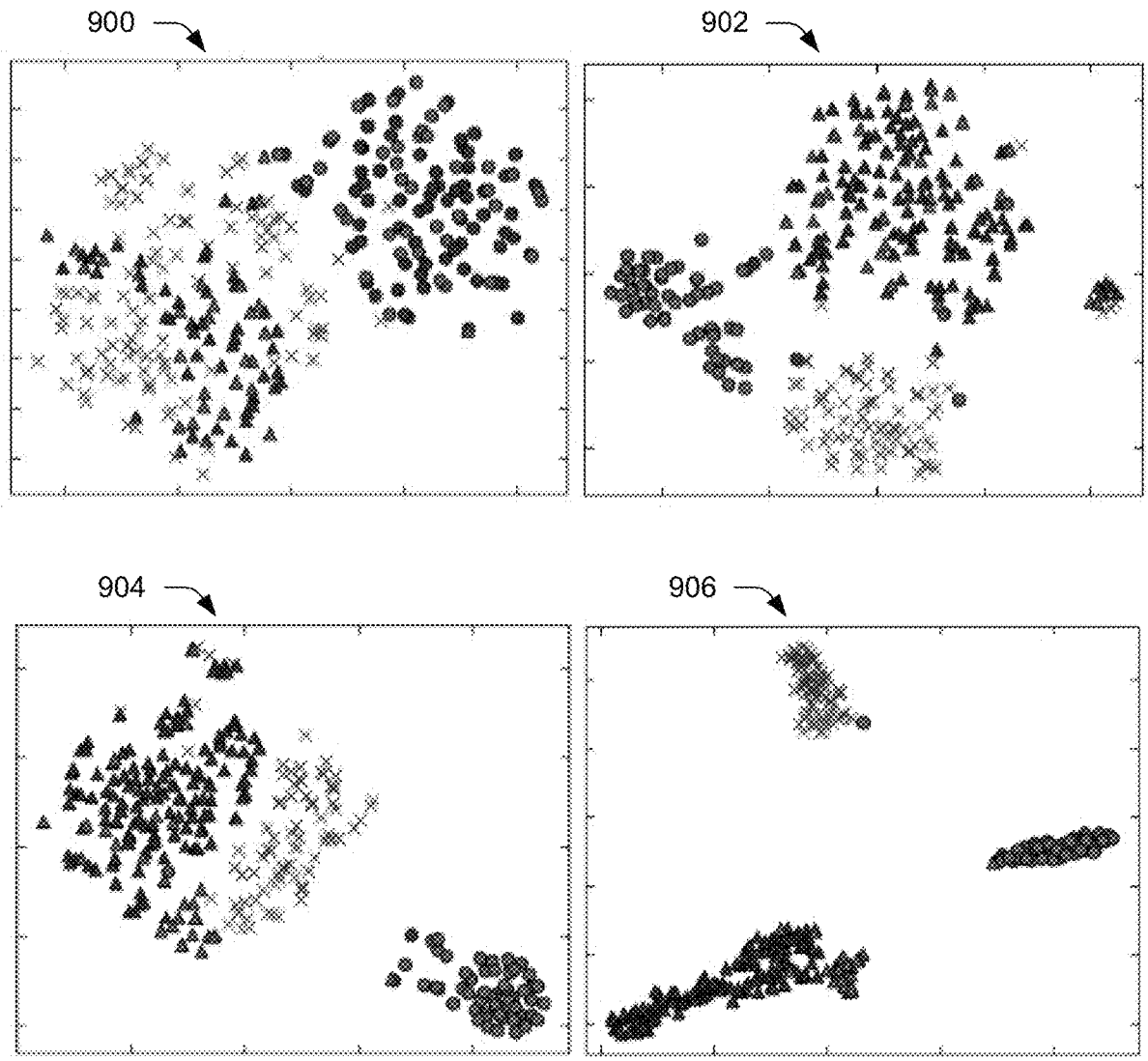
FIG. 9 depicts example representations of a clustering technique at various stages.

Further, the multi-task equidistant embedding techniques described herein are a technological improvement over conventional unsupervised task models. FIG. 9 displays t-Distributed Stochastic Neighbor Embedding (t-SNE) visualizations of different representations of three-hundred randomly sampled points from the Frappe dataset, with different shapes denoting different cluster memberships. Representation 900 depicts a visualization of one-hot encoding of the Frappe dataset, while representation 902 depicts a visualization of an equidistant dense embedding of the same dataset as generated by the equidistant embedding system 120. For example, representation 902 depicts a visualization of the input data subject to the equidistant embedding loss function 406. As shown in 902, the equidistant dense embedding of the data is more discriminative than the one-hot encoding representation 900. Representation 904 depicts a visualization of the dataset generated by the shared representation system 122. For example, representation 904 depicts a visualization of the input data subject to the loss function 410. Representation 906 depicts a visualization of the dataset generated by the exclusive representation system 124. For example, representation 906 depicts a visualization of the input data subject to the joint exclusive loss function 416. As shown in 906, the multi-task model representation of the data is more discriminative than shared model representation 904. As seen in FIG. 9, the multi-task equidistant embedding techniques described herein are a technological improvement over conventional unsupervised task models.

Example Procedures

The following discussion describes techniques that may be implemented utilizing the previously described systems and devices. Aspects of the procedures may be implemented in hardware, firmware, software, or a combination thereof. The procedures are shown as sets of blocks that specify operations performed by one or more devices and are not necessarily limited to the orders shown for performing the operations by the respective blocks. In portions of the following discussion, reference will be made to FIGS. 1-10.

Figure 10:
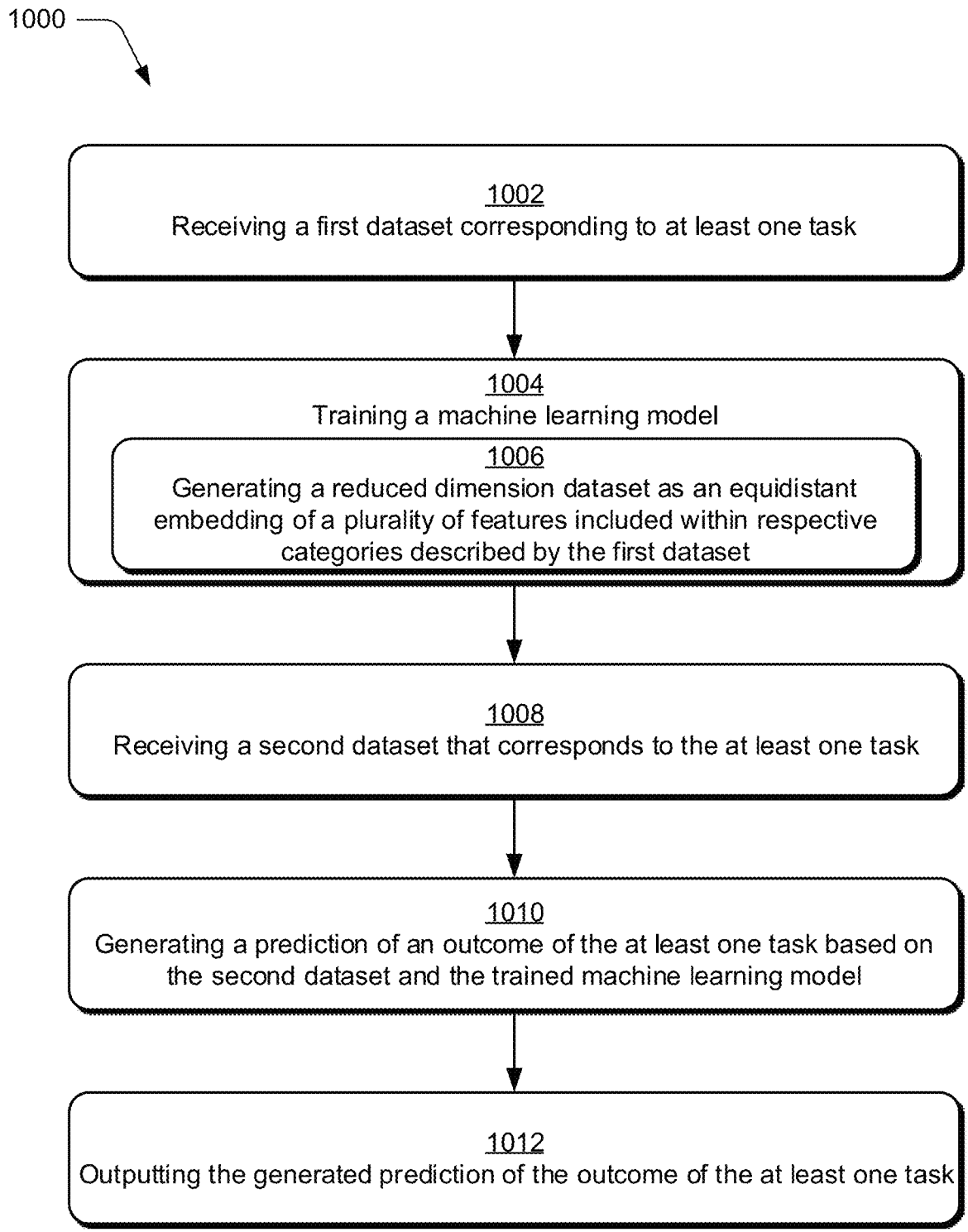
FIG. 10 is a flow diagram depicting a procedure in an example implementation of multi-task equidistant embedding techniques.

FIG. 10 depicts a procedure 1000 in an example implementation of multi-task equidistant embedding. A first dataset corresponding to at least one task is received (block 1002). This may involve, for instance, generation of training data from a dataset as described above. The first dataset describes a plurality of categories and a plurality of features included within respective categories of the plurality of categories. For example, the first dataset may include a category of "internet browser", which in turn includes features such as "Chrome", "Internet Explorer", and "Firefox".

A machine learning model is trained (block 1004). In some implementations, this includes generating a reduced dimension dataset as an equidistant embedding of a plurality of features (block 1006). The equidistant embedding is generated as a part of the training. In alternate implementations, block 1006 is performed independently of training the machine learning model, and in such implementations the reduced dimension dataset is used as an input to the training process for the machine learning model. The equidistant embedding enforces equidistance between the features within each particular category. For example, in the category of "internet browser", the equidistant embedding enforces equidistance between the features "Chrome", "Internet Explorer", and "Firefox" as the machine learning model is trained. The equidistant embedding may enforce equidistant relationships separately for each particular category. Further, a plurality of machine learning models may be trained concurrently, such as to train a supervised model corresponding to a first supervised task and an unsupervised model corresponding to a second unsupervised task.

The machine learning model refers to a computer representation that can be tuned (e.g., trained) based on inputs to approximate unknown functions. In particular, a machine learning model can include a model that utilizes algorithms to learn from, and make predictions on, known data by analyzing the known data to learn to generate outputs that reflect patterns and attributes of the known data. For instance, a machine learning model can include but is not limited to, decision trees, support vector machines, linear regression, logistic regression, Bayesian networks, random forest learning, dimensionality reduction algorithms, boosting algorithms, artificial neural networks, deep learning, and so forth. Thus, a machine learning model makes high-level abstractions in data by generating data-driven predictions or decisions from the known input data. The training of the machine learning model may be performed, for example, by the system 400 of FIG. 4, such as through creation of the task prediction model 126a. Where multiple machine learning models are trained, it may be performed, for instance, as a single neural network that includes shared layers corresponding to multiple tasks and multiple exclusive layers corresponding to particular tasks that are all subject to the same training criterion and training process. In this way, information may be shared among tasks, such as to allow information corresponding to a first task to be utilized while training a model corresponding to a second task, and so forth.

A second dataset corresponding to the at least one task is received (block 1008). The second dataset may include, for example, data corresponding to subsequent observations that were recorded after the machine learning model was trained in block 1008, such as the subsequent observation 308 of FIG. 3. A prediction of an outcome of the at least one task is generated based on the second dataset and the trained machine learning model (block 1010). The second dataset may be used as an input to the trained machine learning model. The trained machine learning model then processes the second dataset to predict an outcome based on features included within the second dataset according to feature interactions learned by the trained machine learning model. The generated prediction of the outcome of the at least one task is output (block 1012), e.g., to control subsequent output of digital content 114, for display in a user interface, and so forth. In this way, the techniques described herein may address a wide range of categorical feature data as part of analysis and classification for a wide range of device and user action prediction scenarios, which is not possible using conventional techniques.

Having discussed some example procedures, consider now a discussion of an example system and device in accordance with one or more implementations.

Example System and Device

Figure 11:
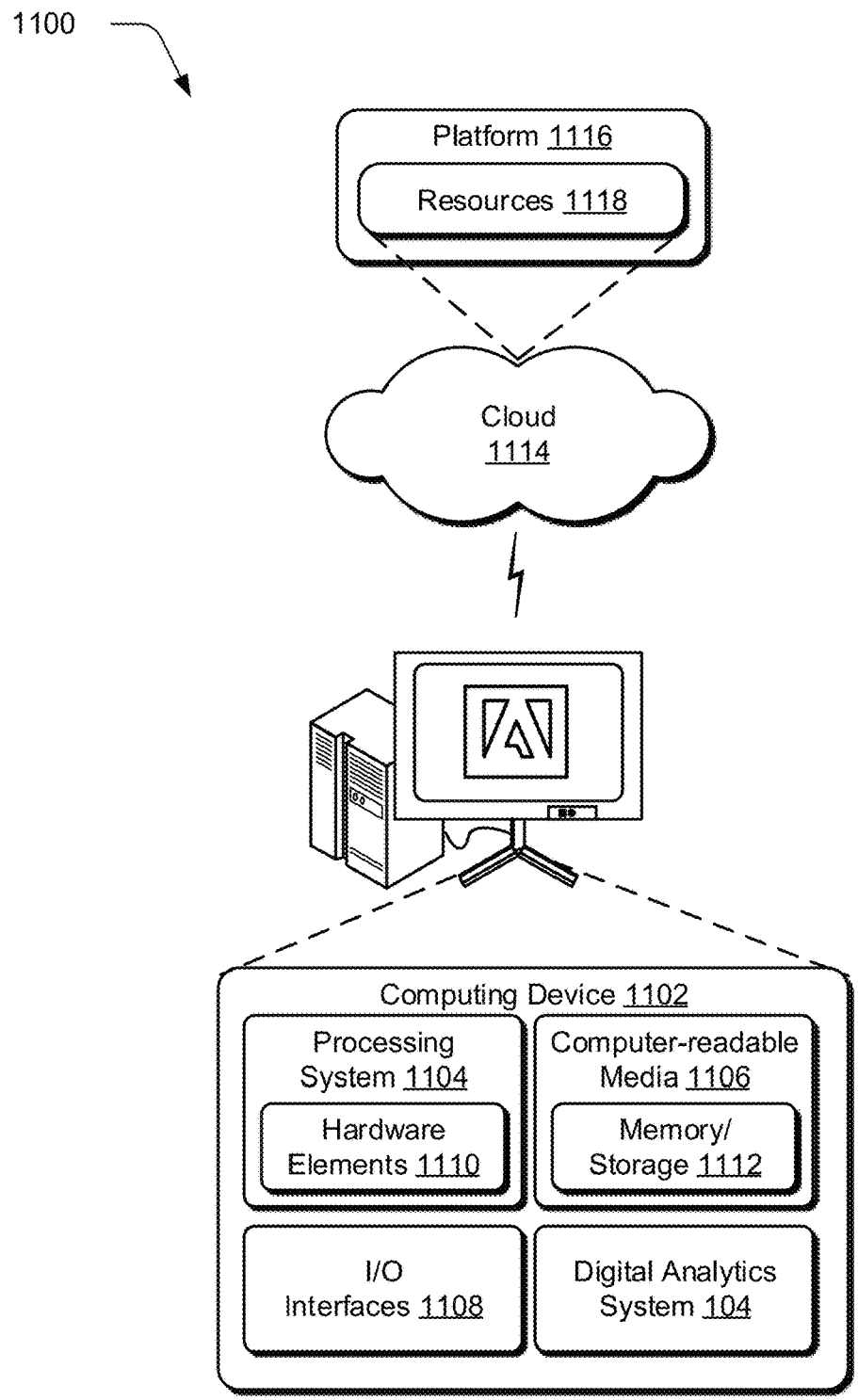
FIG. 11 illustrates an example system including various components of an example device that can be implemented as any type of computing device as described and/or utilized with reference to FIGS. 1-10 to implement embodiments of the techniques described herein.

FIG. 11 illustrates an example system generally at 1100 that includes an example computing device 1102 that is representative of one or more computing systems and/or devices that may implement the various techniques described herein. This is illustrated through inclusion of the digital analytics system 104. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    receiving, by at least one processing device, a dataset corresponding to a plurality of tasks, the dataset describing a dimension space having a plurality of categories and a plurality of features formatted as one-hot encoding vectors corresponding to tasks included within respective categories of the plurality of categories, the plurality of features having equidistant relationships, one to another, within respective said categories in the dimension space;
    generating, by the at least one processing device, a shared representation of the plurality of the tasks of the dataset based on a reduced dimension dataset in a reduced dimension space that is reduced in comparison with the dimension space of the dataset, the reduced dimension dataset maintaining the equidistant relationships, one to another, of the plurality of features, respectively, within the respective said categories from the dataset by:
        applying constraints to the dataset using an embedding loss function based on a comparison between a dense embedding matrix and a binary feature matrix;
        concatenating embeddings of the reduced dimension dataset;
        performing batch normalization on the reduced dimension dataset; and
        reducing overfitting of the reduced dimension dataset by randomly dropping units from the reduced dimension dataset;
    generating, by the at least one processing device, an exclusive representation of a particular task of the dataset by extracting complementary information including feature interactions by:
        segmenting the particular task from the plurality of tasks of the dataset using k-means clustering; and
        comparing the particular task to the plurality of tasks of the dataset using a joint loss function that includes an embedding loss and a segmentation loss based on the k-means clustering; and
    training, by the at least one processing device, a machine learning model based on the reduced dimension dataset of the shared representation and the complementary information of the exclusive representation to generate a prediction of an outcome of the particular task of the dataset from the exclusive representation.

2. The method of claim 1, further comprising:
    receiving, by the at least one processing device, an additional dataset that corresponds to the particular task, the additional dataset describing the plurality of categories and the plurality of features;
    generating, by the least one processing device, a prediction of an outcome of the particular task based on the additional dataset and the trained machine learning model; and
    outputting, by the at least one processing device, the generated prediction of the outcome of the particular task.

3. The method of claim 1, wherein the plurality of tasks comprises at least a first task and a second task, and wherein the training the machine learning model comprises training a first machine learning model corresponding to the first task and training a second machine learning model corresponding to the second task.

4. The method of claim 3, wherein the first task is a supervised task and the second task is one of a supervised task or an unsupervised task.

5. The method of claim 3, wherein the first machine learning model and the second machine learning model are trained from a neural network that includes shared layers corresponding to the first task and the second task, exclusive layers corresponding to the first task, and exclusive layers corresponding to the second task.

6. The method of claim 3, wherein the second machine learning model is trained utilizing information corresponding to the first task.

7. The method of claim 1, wherein the reduced dimension dataset includes an equidistant embedding that enforces, for each respective category of the plurality of categories, the equidistant relationship among the plurality of features included within the respective category.

8. The method of claim 1, wherein the generating the reduced dimension dataset is performed as a part of the training the machine learning model.

9. At least one processing device including a processing system and at least one computer-readable storage medium, the at least one processing device comprising:
- equidistant embedding layers of a neural network, the equidistant embedding layers configured to enforce, for each respective category of a plurality of categories described in a dataset, an equidistant relationship defined using a distance measurement among a plurality of features formatted as one-hot encoding vectors corresponding to tasks included within the respective category in a reduced dimension dataset in a reduced dimension space from a dimension space that is maintained from the dataset, the reduced dimension space generated by:
  - applying constraints to the dataset using an embedding loss function based on a comparison between a dense embedding matrix and a binary feature matrix;
  - concatenating embeddings of the reduced embedding space;
  - performing batch normalization on the reduced dimension dataset; and
  - reducing overfitting of the reduced dimension dataset by randomly dropping units from the reduced dimension dataset;
- shared layers of the neural network, the shared layers configured to extract feature interactions between the features described in the dataset corresponding to at least one of a first task and a second task;
- exclusive layers of the neural network corresponding to the first task, the exclusive layers corresponding to the first task configured to utilize the extracted feature interactions to generate a first machine learning model corresponding to the first task by:
  - segmenting the first task from the plurality of tasks of the dataset using k-means clustering; and
  - comparing the first task to the plurality of tasks of the dataset using a joint loss function that includes an embedding loss and a segmentation loss based on the k-means clustering; and
- exclusive layers of the neural network corresponding to the second task, the exclusive layers corresponding to the second task configured to utilize the extracted feature interactions to generate a second machine learning model corresponding to the second task.

10. The at least one processing device of claim 9, the at least one computer-readable storage medium storing processor-executable instructions that, responsive to execution by the processing system, cause the processing system to perform operations comprising:
- receiving a second dataset corresponding to the first task;
- generating a prediction of an outcome of the first task based on the second dataset and the first machine learning model; and
- outputting the generated prediction of the outcome of the first task.

11. The at least one processing device of claim 9, wherein the first machine learning model and the second machine learning model are generated concurrently.

12. The at least one processing device of claim 9, wherein the first task is a supervised task and the second task is an unsupervised task.

13. The at least one processing device of claim 9, wherein the first task is a supervised task and the second task is a supervised task.

14. The at least one processing device of claim 9, wherein the extracting feature interactions includes determining complementary information beneficial to the first task and the second task.

15. The at least one processing device of claim 9, wherein the extracting feature interactions includes determining a feature interaction beneficial to the first task, and wherein the generating the second machine learning model corresponding to the second task includes utilizing the determined feature interaction.

16. The at least one processing device of claim 9, wherein the generating the first machine learning model and the generating the second machine learning model are subject to same training criterion.

17. A computer-readable storage medium storing executable instructions, which when executed by a processing device, cause the processing device to perform operations comprising:
- receiving a dataset corresponding to at least one task, the first dataset describing a three-dimensional Euclidean space having three categories and a plurality of features formatted as one-hot encoding vectors corresponding to tasks included within respective said categories, the plurality of features having equidistant relationships, one to another, within respective said categories in the three-dimensional space;
- generating training data that enforces the equidistant relationships of the plurality of features corresponding to the dataset in the three-dimensional space within respective said categories in a two-dimensional space by:
  - applying constraints to the dataset using an embedding loss function based on a comparison between a dense embedding matrix and a binary feature matrix;
  - extracting complementary information including feature interactions by:
    - segmenting a particular feature from the plurality of features of the dataset using k-means clustering; and
    - comparing the particular feature to the plurality of features of the dataset using a joint loss function that includes an embedding loss and a segmentation loss based on the k-means clustering;
  - concatenating the training data with the complementary information;
- training a machine learning model using the training data;
  - performing batch normalization on the training data; and
  - reducing overfitting of the training data by randomly dropping units from the training data;
- receiving an input corresponding to the at least one task;
- generating a prediction of an outcome of the at least one task based on the input and the trained machine learning model; and
- outputting the generated prediction of the outcome of the at least one task.

18. The computer-readable storage medium of claim 17, wherein the at least one task comprises at least a first task and a second task, and wherein training the machine learning model comprises training a first machine learning model corresponding to the first task and means for training a second machine learning model corresponding to the second task.

19. The computer-readable storage medium of claim 18, wherein the first task is a supervised task and the second task is an unsupervised task.

20. The computer-readable storage medium of claim 18, wherein the first task and the second task are unsupervised tasks.

* * * * *

UNITED STATES PATENT AND TRADEMARK OFFICE
CERTIFICATE OF CORRECTION

PATENT NO. : 12,182,713 B2
APPLICATION NO. : 16/203263
DATED : December 31, 2024
INVENTOR(S) : Handong Zhao et al.

Page 1 of 1

It is certified that error appears in the above-identified patent and that said Letters Patent is hereby corrected as shown below:

In the Claims

Column 22, Line 27, after "task, the", delete "first".

Signed and Sealed this
Fourth Day of March, 2025

Coke Morgan Stewart
*Acting Director of the United States Patent and Trademark Office*